United States Patent [19]

Smith et al.

[11] Patent Number: 6,094,169
[45] Date of Patent: Jul. 25, 2000

[54] MULTILATERATION AUTO-CALIBRATION AND POSITION ERROR CORRECTION

[75] Inventors: Alexander E. Smith, McLean; Derrick D. Lee, Woodbridge, both of Va.

[73] Assignee: Rannoch Corporation, Alexandria, Va.

[21] Appl. No.: 09/209,008

[22] Filed: Dec. 11, 1998

[51] Int. Cl.$^7$ ............................... G01S 3/02; G01S 13/00
[52] U.S. Cl. ........................... 342/465; 342/39; 342/450
[58] Field of Search .................................... 342/365, 457, 342/455, 456, 463, 465, 458, 450, 37, 39, 165; 340/991

[56] References Cited

U.S. PATENT DOCUMENTS

| | | | |
|---|---|---|---|
| 4,229,737 | 10/1980 | Heldwein et al. | 343/6 |
| 4,524,931 | 6/1985 | Nilsson | 342/458 |
| 5,365,516 | 11/1994 | Jandrell | 370/18 |
| 5,570,095 | 10/1996 | Drouilhet et al. | 342/357 |
| 5,774,829 | 6/1998 | Cisneros et al. | 701/213 |

OTHER PUBLICATIONS

Baldwin, Jonathan, "Traffic Alert System Technical Design Summary".
Rannoch Brochure, "AirScene: The Complete Air Traffic Picture in Real Time", www. AirScene.com, www.rannoch. com.
Rudel, Marc–Philippe, Baldwin, Jonathan, "GPS Relative Accuracy for Collision Avoidance", Navigation Technical Meeting in Santa Monica, California, Jan. 1997.

Primary Examiner—Thomas H. Tarcza
Assistant Examiner—Fred H. Mull
Attorney, Agent, or Firm—Robert P. Bell

[57] ABSTRACT

The accuracy of multilateration systems can be greatly improved by using a correction method based on the SLS (Sideband Lobe Suppression) signal produced by a Secondary Surveillance Radar (SSR). Multilateration is a cooperative surveillance technique for aircraft equipped with Air Traffic Control Radar Beacon System (ATCRBS), Mode S, or Automatic Dependent Surveillance Broadcast (ADS-B) transponders. When one of these transponders aboard a vehicle is interrogated, it responds by broadcasting a message based on what the interrogation requests. These reply messages may be multilaterated to determine the source position of the transmission. Multilateration is a Time Difference of Arrival (TDOA) technique similar to triangulation. Multilateration can be performed to locate the transmission source of any SSR signal. Error detection and correction may be performed on the system by conducting a comparison of a known TDOA for the receiver/transmitter geometry, to the measured TDOA from a Side Lobe Suppression (SLS) pulse emanating from a primary radar.

14 Claims, 6 Drawing Sheets ly, the present invention provides a
MULTILATERATION AUTO-CALIBRATION AND POSITION ERROR CORRECTION

FIELD OF THE INVENTION

The present invention relates to the methods and apparatus used for error detection and calibration of multilateration systems. In particular, the present invention provides a technique for calibrating multilateration systems used for aircraft tracking.

BACKGROUND OF THE INVENTION

Multilateration techniques are known in the art. Such techniques may be used to locate the source of a radio transmission based upon differences in time of arrival (TOA) of radio signals at multiple receivers of known position. Such multilateration systems are illustrated, for example, in Heldwein et al. U.S. Pat. No. 4,229,737, issued Oct. 21, 1980; Jandrell, U.S. Pat. No. 5,365,516, issued Nov. 15, 1994, and Drouilhet Jr. et al. U.S. Pat. No. 5,570,095, issued Oct. 29, 1996, all of which are incorporated herein by reference.

Secondary Surveillance Radar (SSR) systems are used to track almost all commercial and many general aviation aircraft. An SSR system may send an interrogation signal to an aircraft in range of the radar on a 1030 MHz carrier frequency. All aircraft transponders which receive an appropriate interrogation reply to the SSR system on a 1090 MHz carrier frequency. In addition to SSR interrogations, TCAS (Traffic Alert Collision Avoidance System) units interrogate on a 1030 MHz carrier frequency for the purpose of collision avoidance.

Multilateration is a cooperative surveillance technique for aircraft equipped with Air Traffic Control Radar Beacon System (ATCRBS), Mode S, or Automatic Dependent Surveillance Broadcast (ADS-B) transponders described in U.S. Pat. No. 5,570,095, incorporated herein by reference. Prior Art multilateration systems utilize the 1090 MHz reply signals to perform a TDOA (Time Difference of Arrival) calculation to determine the origin of the transmission.

A plurality of receivers at different locations are used to receive the 1090 MHz reply signal. Each receiver used in the multilateration system utilizes a clock that is synchronized to a common time base. GPS (Global Positioning System) time, for example, may be used as a common time base.

When a 1090 MHz transponder reply transmission is received at a receiver, the message is time stamped and sent to a central location (via radio or hard-wire network) where the information gathered by all receivers is used to compute the origin of the transmission based upon the difference in propagation time of the 1090 MHz signal from the airplane to various receivers.

As with any system, there are errors associated with multilateration. Each receiver will have inherent errors based on properties such as clock drift and system latency. When the data from all receivers is combined for a solution, these errors produce one overall system error.

One way to reduce such error is to utilize a reference transponder to reduce overall system error. The reference transponder broadcasts on a 1090 MHz carrier frequency and is located at a known position. Because the position of each receiver is known and the location of the reference transponder is known, the time difference between reception of the reference transponder signal can be calculated. A single receiver is then chosen as a starting point for the calibration.

Since multilateration calculations depend on the differences in time of arrival and not time of arrival itself, correction of the DTOA is sufficient to correct the system. The starting receiver can be selected without concern for its accuracy but rather by some other criteria such as reception rates. The actual time differences between TOAs are compared to the calculated values and the corrections made to each receiver to adjust for the errors in DTOA.

Such a technique requires the construction and installation of a reference transponder, antenna, and associated support equipment. Moreover, such a broadcast installation may require licensing by government authorities (e.g., FCC). It would be preferable to utilize passive (e.g., receive-only) equipment for multilateration, as such equipment installations may not require governmental licensing. Moreover, a passive solution may reduce the amount of equipment and thus reduce overall cost.

Prior art SSR systems transmit RF signals in a pattern as illustrated in FIG. 2. When an SSR transmits an interrogation signal, the main beam 21 produces side lobes 22 as a side effect. Transponders receiving these side lobe transmissions must be suppressed from transmitting a reply in order to prevent confusion between transponders responding to the main beam and the side lobes.

In order to suppress spurious replies from side lobes 22, the SSR transmits omni-directional SLS (sideband lobe suppression) pulse 12. SLS pulse 12 transmitted simultaneously with the SSR pulse at a power slightly greater than the power of the strongest side lobe, as illustrated in FIG. 2. When a transponder receives an interrogation, it compares the interrogation to SLS pulse 12. If SLS pulse 12 has a power greater than the interrogation, no reply is produced. SLS pulse 12 is transmitted with each interrogation.

SUMMARY OF THE INVENTION

The Multilateration Auto-Calibration & Position Error Correction System of the present invention is a truly passive method of error detection and correction. The system utilizes the Side Lobe Suppression (SLS) pulse from an SSR as a reference signal from a known position to determine error corrections.

The SLS pulse possesses a high transmission rate, radiates from a source having a known position, and is omni-directional. Thus, the SLS pulse makes an ideal reference signal for error correction calculations.

The DTOAs for the SLS pulse are a known constant. Therefore, the received DTOAs from the SLS pulse are compared to the calculated DTOAs in the same fashion as the reference transponder method and the corrections for each receiver calculated based on the difference in the known DTOA and the received DTOA. Any subsequent receptions of a 1090 MHz signal from a transponder are corrected with an individual correction time for each receiver thereby calibrating the system of receivers used for multilateration. These corrections are made prior to multilateration calculations.

The method of calibration has the capability to correct receivers that are not in line of sight with the SSR transmitter. When a correction is obtained for a set of receivers, the receivers can perform multilateration on any given transponder with great accuracy. When the calibrated set of receivers computes the location of a transponder, the time of transmission may then also be computed.

Time of transmission from a transponder plus the propagation times for individual receivers may then be compared to the actual TOA at the receiver. The time difference in calculated and observed TOAs is the error correction for that individual receiver. The error correction method of the present invention requires only one set of receivers to be calibrated directly by the SSR SLS pulse. As long as there are transponders broadcasting where the transmitted signal is received by one calibrated set of receivers for multilateration, error detection and system calibration can be performed on any other receiver detecting the same transponder signal.

Propagation of calibration extends the error detection and correction capability to receivers that are not even receiving the SLS pulse. Propagation of calibration may be performed using a transponder of opportunity. In a system where some of the receivers have been calibrated, a transponder reply message is received by the calibrated receivers as well as uncalibrated ones. TDOA analysis may then be performed for all receivers. Since the position of all the receivers is known, the TDOA analysis will reveal the error in the uncalibrated receiver.

DETAILED DESCRIPTION OF THE INVENTION

Figure 1:
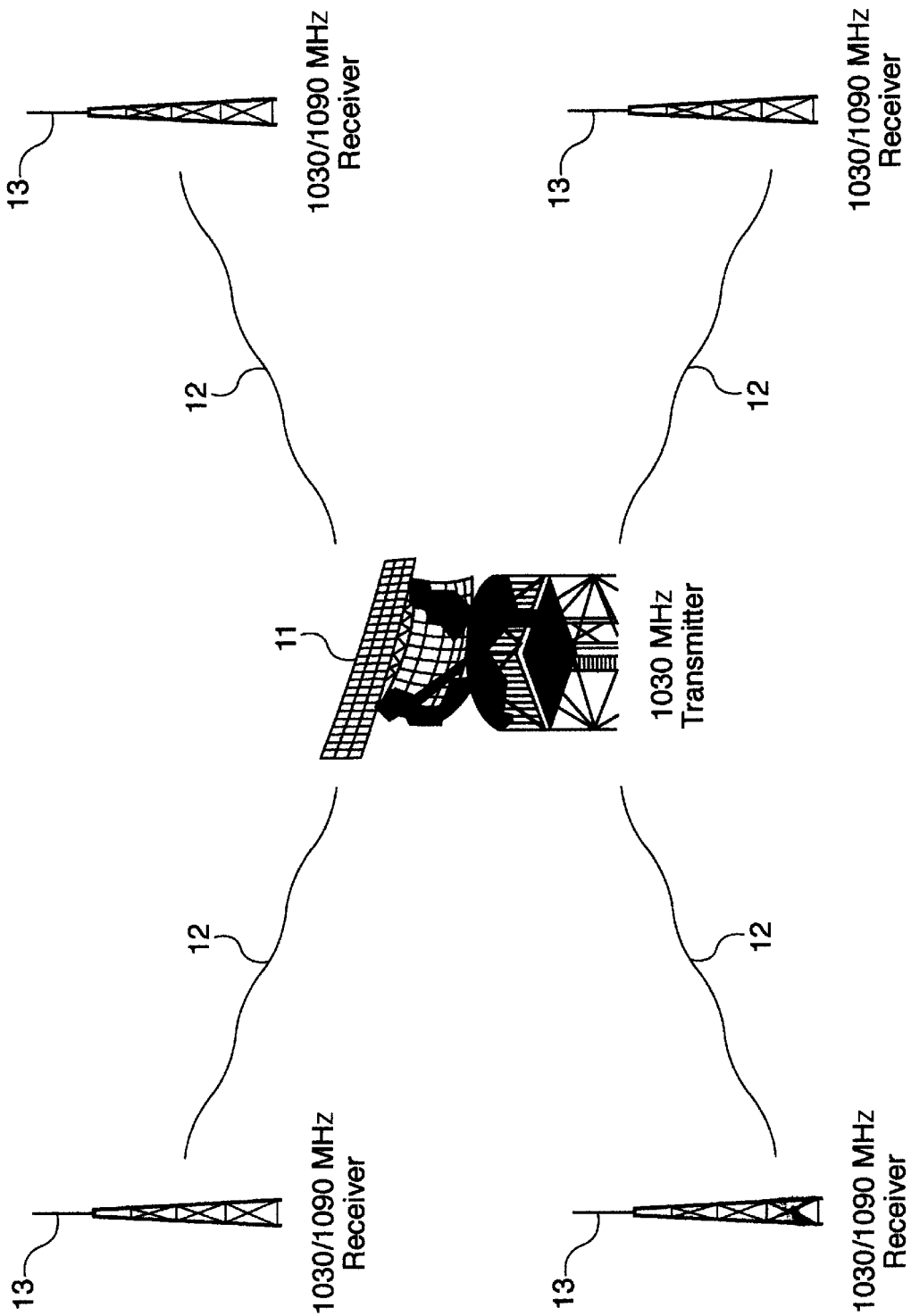
FIG. 1 is a diagram illustrating an SSR broadcasting the SLS pulse to four receivers.
Figure 2:
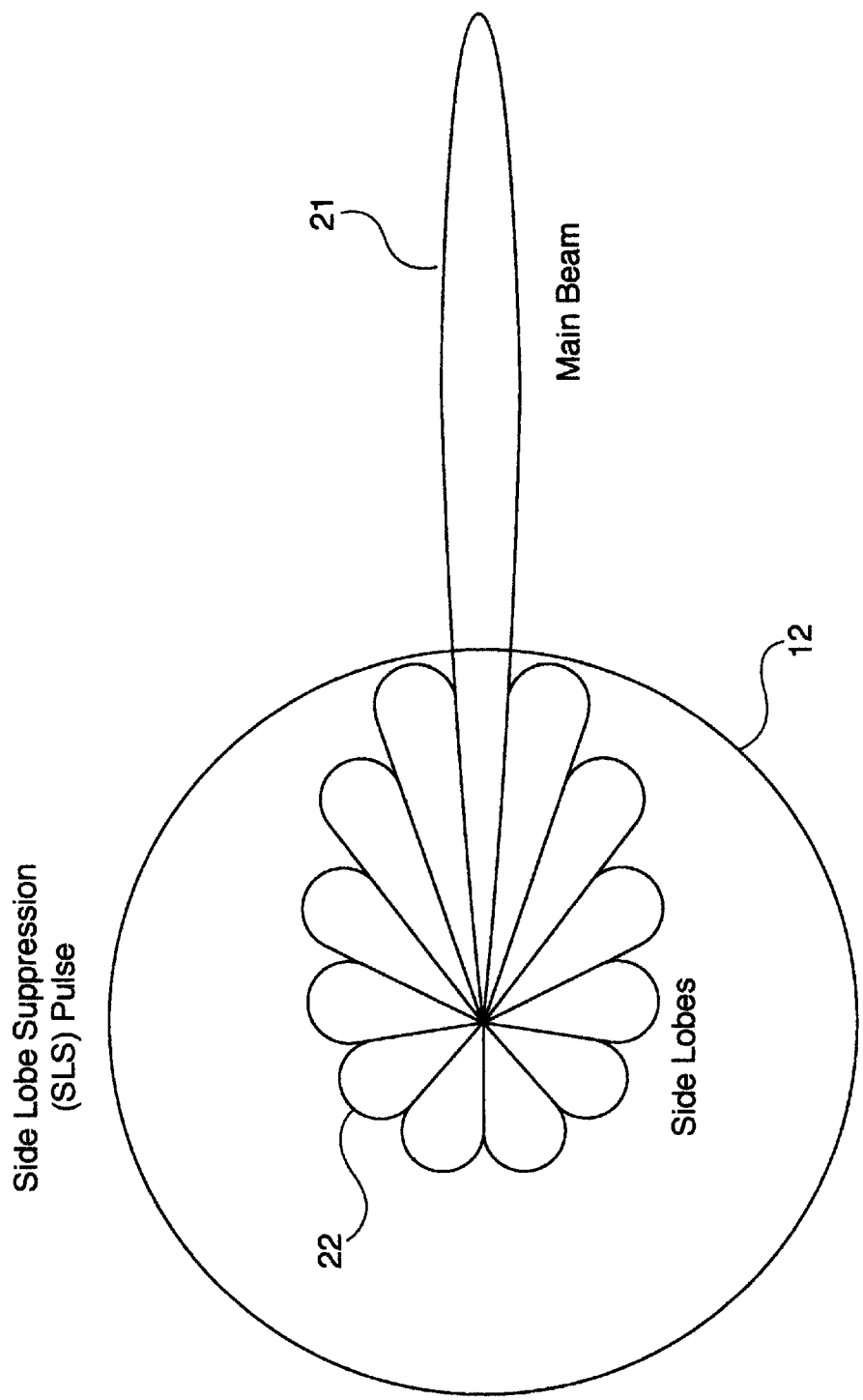
FIG. 2 is a polar signal power diagram illustrating the configuration of 1030 MHz transmissions from an SSR and the SLS pulse.

Referring to FIG. 1, the multilateration system is set up in a manner as to optimize overall reception geometry and to maximize the number of receivers 13 capable of receiving 1030 MHz SLS pulse 12 from SSR 11. generally, the more units receiving SLS pulse 12, the higher the degree of accuracy that may be achieved. The position of SSR transmitter 11 is known (typically fixed on or near an airport). Similarly, the locations of receivers 13 may be known or determined using GPS equipment or the like.

Figure 3:
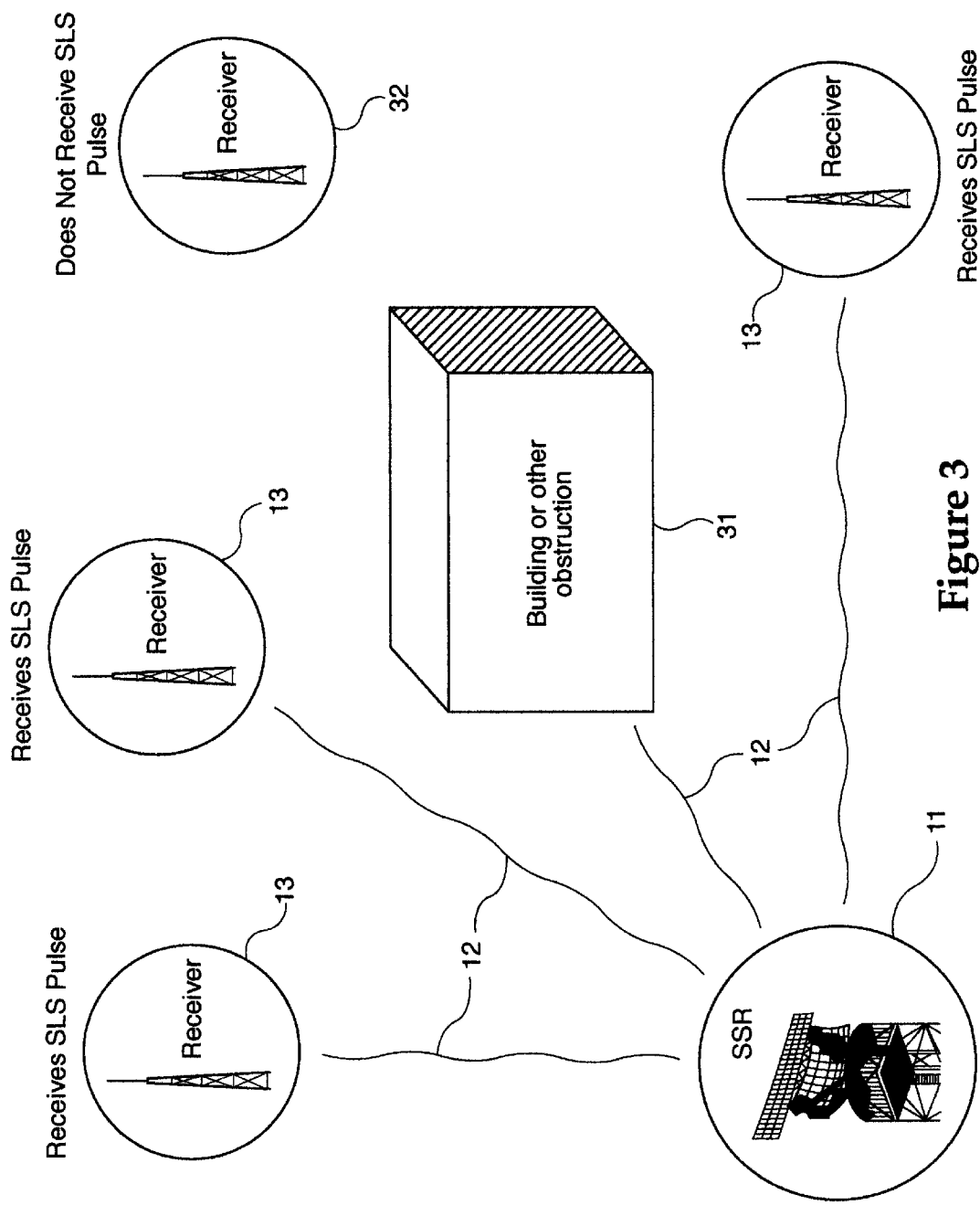
FIG. 3 is a diagram illustrating an obstacle blocking the SLS pulse from reaching a receiver.

FIG. 3 is a diagram illustrating an embodiment of a receiver configuration where three receivers 13 are in line of sight with SSR 11 and receiving SLS pulse 12, and a fourth receiver 32 is not receiving SLS pulse due to obstruction 31. The error detection and correction system of the present invention can handle this situation by using an airborne transponder as a reference transponder.

Figure 4:
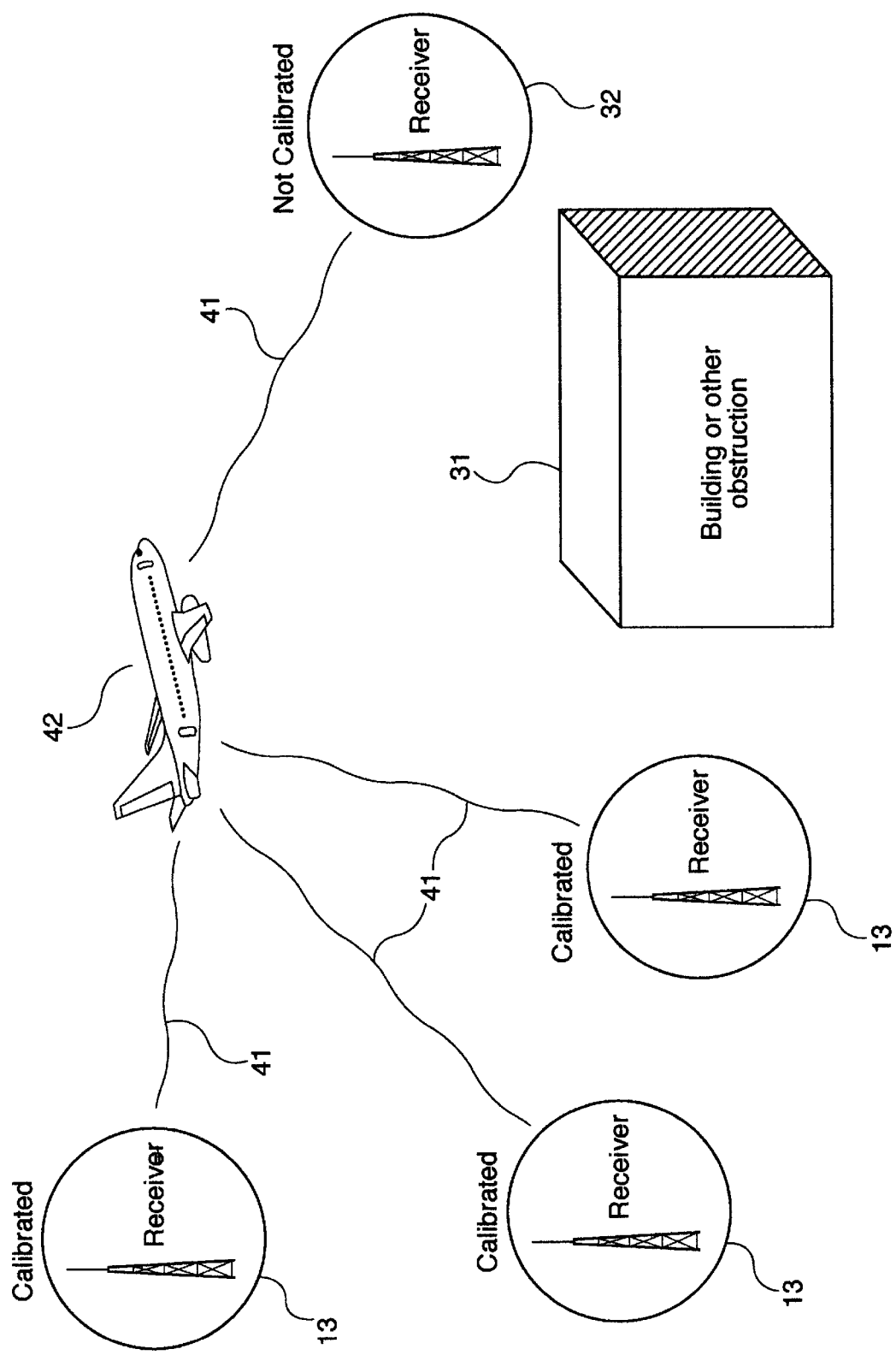
FIG. 4 is a diagram illustrating an aircraft transmitting a 1090 MHz reply to three calibrated receivers as well as an uncalibrated receiver.

Referring to FIG. 4, the system's receivers 13 have been calibrated using the SLS pulse but receiver 32 has not. All receivers including receiver 32 receive a 1090 MHz response 41 from the airborne transponder 42. A multilaterated position solution for airborne transponder 42 is calculated using calibrated receivers 13.

Since calibrated receivers 13 have been corrected for system errors, TDOA for fourth uncalibrated receiver 32 may be determined and thus a correction made if the measured TDOA is different from the computed value. The example of FIG. 4 illustrates how error correction can be extended for receivers that do not receive the SLS pulse.

Figure 5:
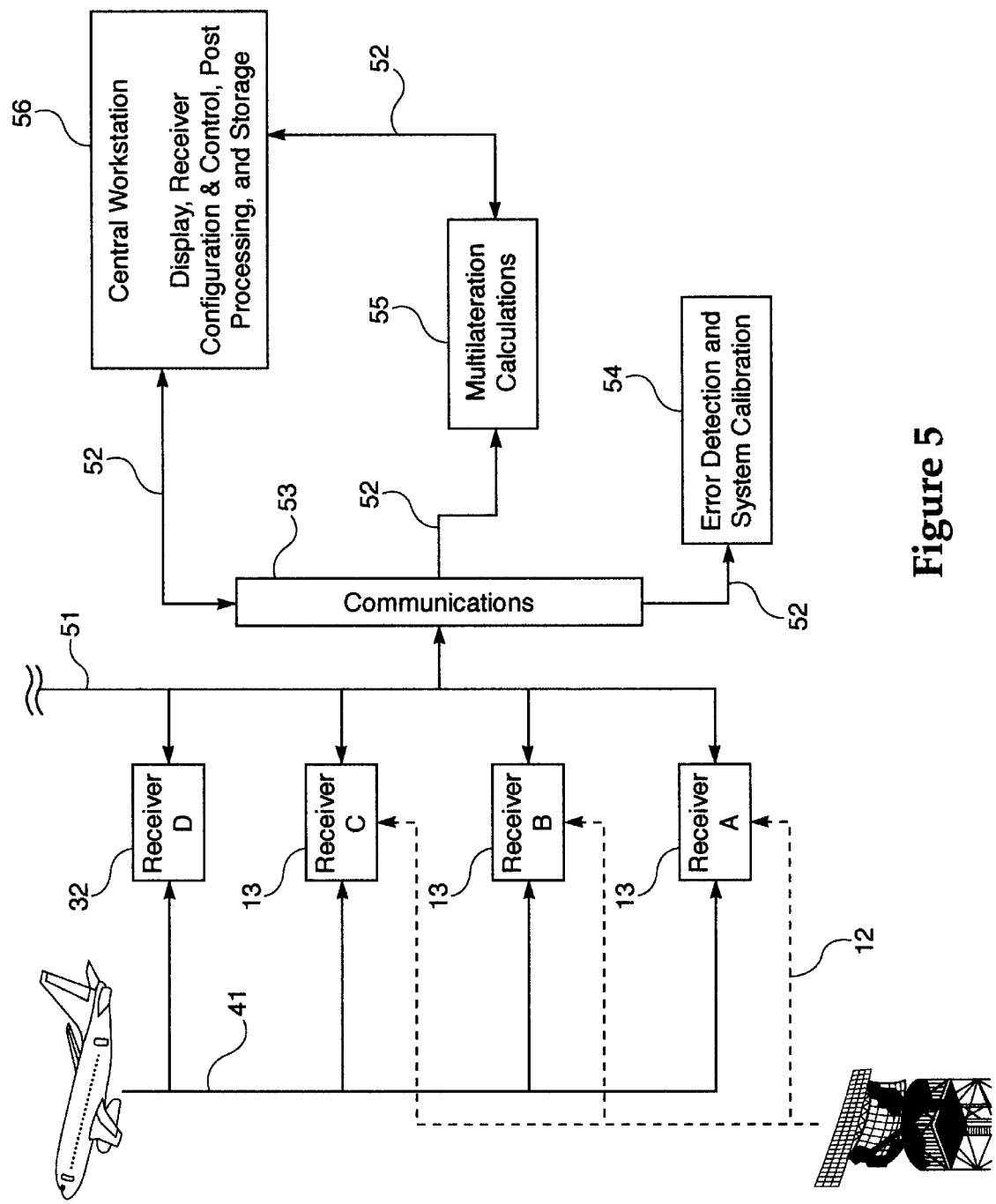
FIG. 5 is a block diagram illustrating the overall system configuration.

FIG. 5 is a block diagram illustrating an embodiment of the overall system and system process. SLS pulses 12 and transponder replies 41 are received by the receivers 13. In the example of FIG. 5, receiver 32, may be blocked from receiving SLS pulse 12 and receive only transponder replies 41. Each of receivers 13 determine the time of arrival (TOA) of each SLS pulse 12 and transponder reply 41 using a common calibrated clock signal (e.g., GPS clock or the like). Receiver 32 determines only the time of arrival (TOA) of transponder reply 41 using the common calibrated clock signal.

Each of receivers 13 and 32 then transmits TOA information via data link 51 to the communication module 53 as individual data messages. Data link 51 may comprise a secondary RF channel dedicated to such communications. Alternately, data link 51 may comprise a telephone link, internet link, or other data path. Since TOA data has already been calculated, the latency of data link 51 is largely immaterial so long as TOA data is received to be processed in a timely manner for an end user.

Communications module 53 determines the nature of each data message and sends it to a proper processing module via processing links 52. Error detection module 54 receives SLS pulse information and determines the system error for each receiver 13. System error information is then sent to multilateration processing module 55 along with transponder reply messages. Data from receivers 13 and 32 is corrected based on information provided from error detection module 54. Results from multilateration module 55 are sent to central workstation module 56 which may display results (e.g., corrected aircraft position information), coordinate system operation, and control each of receivers 13 and 32.

Figure 6:
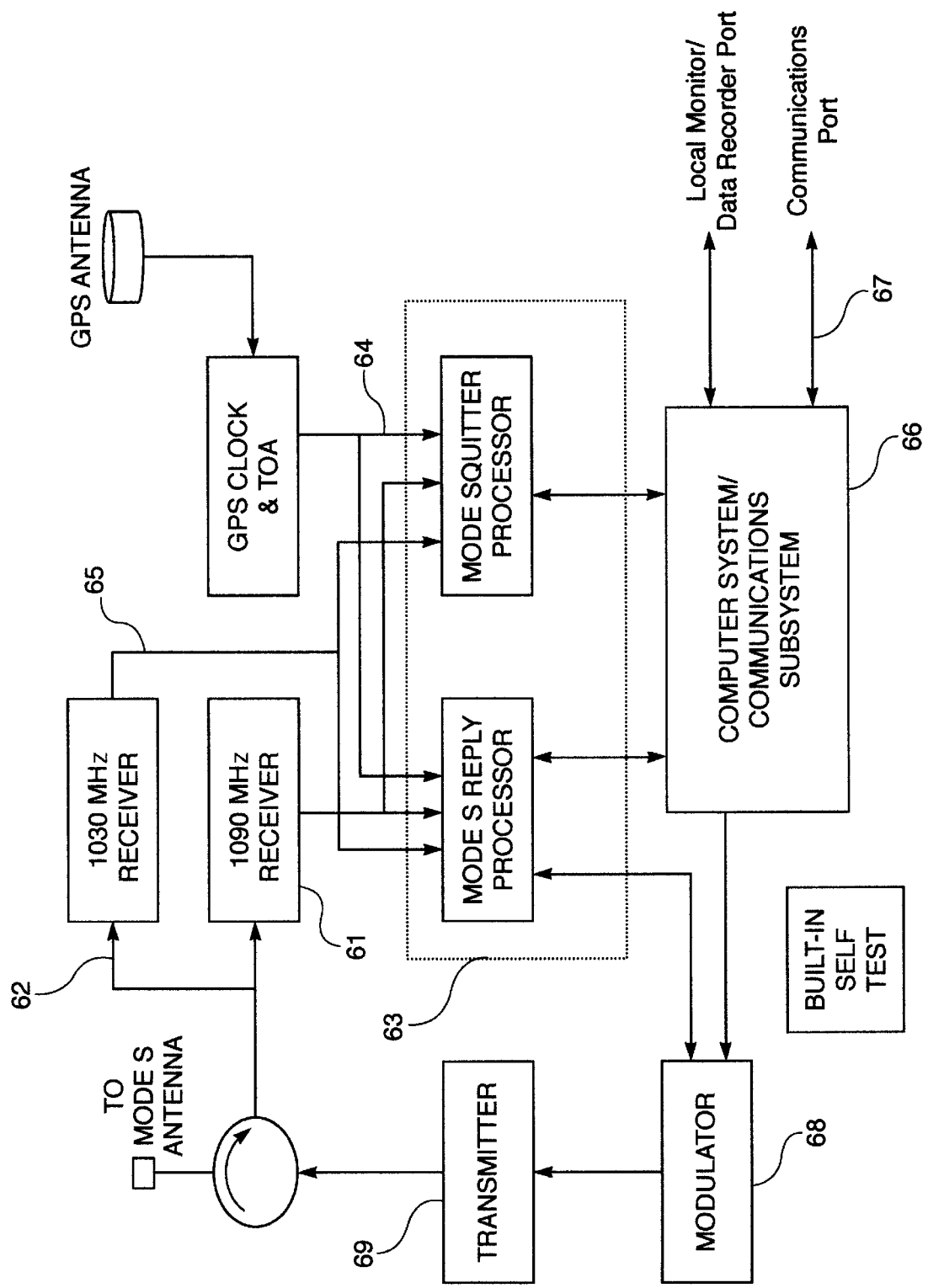
FIG. 6 is a detailed block diagram illustrating the components in one of receivers A, B, C, D, of FIG. 5.

FIG. 6 is a block diagram illustrating an embodiment of one of receivers 13 and 32 comprising a multilateration system. SSR signals may be received at 1090 MHz receiver 61 and 1030 MHz receiver 62. 1090 MHz reply signals are decoded by Mode S reply processor and Mode S squitter processor 63. Each reply is assigned a time of arrival based on GPS time 64.

Periodic reception of 1030 MHz interrogation signal 65 from a ground interrogator is also time stamped and passed on to computer system 66. SSR time stamp data and 1030 MHz reference signal time stamp data may then be transmitted via communications port 67 over data link 51 to communications module 53 as was illustrated in FIG. 5.

As illustrated in FIG. 5, multilateration solutions are computed for SSR time stamp data and 1030 MHz reference signal time stamp data. If a 1030 MHz reference position is computed that is different than expected an alarm or alert may be sent to the operator at central workstation 56 and offsets are calculated for other SSR multilateration solutions.

In FIG. 6, modulator 68 and transmitter 69 are optional and may be used to elicit replies from non-Mode S equipped aircraft. Such equipment may be used to expand the capabilities of the system to include non-Mode S aircraft. However, transmitter 69 may require licensing and thus reduce the passiveness of the system of the present invention.

The passive solution of the present invention may be useful for a number of purposes. For example, the system of the present invention may allow third parties to setup passive radio receiver equipment to accurately monitor position of aircraft within range of a given SSR (typically at or near an airport or large metropolitan area or the like). Aircraft position data may then be used to generate representational graphic images (e.g., map display) illustrating the position of each aircraft within a given area.

Such data has a number of uses. For example, airlines may use such information to more accurately track aircraft position and thus be better prepared for aircraft arrivals. Citizen groups and local governments can use such equipment in conjunction with strategically placed microphones and recording devices for noise abatement monitoring.

Aircraft position data may also be transmitted (as a digital data stream) to other aircraft in the area for auxiliary collision avoidance and traffic monitoring purposes. Aircraft position data may be graphically represented on a cockpit display or may be processed with aircraft GPS data to generate collision avoidance alarms or traffic control warnings.

In addition, such data may also be stored and later recalled for accident investigation, as well as for "near-miss" incidents and the like. Such aircraft position data may be a useful backup to traditional radar tapes and the like.

Aircraft position data generated by the present invention may be used as a backup position data system for air traffic control purposes, should one or more primary systems be disabled. Of course, if the SSR transmitter is disabled, the system of the present invention may not be able to generate position correction and calibration data. In such a scenario, the optional transmitter 69 and modulator 68 of FIG. 6 may be utilized to stimulate transponder signals from aircraft.

In addition to the above applications, the present invention may also be used as a system integrity and monitor check. Thus, for example, the system may multilaterate the position of a transmitter of known position (e.g., SSR transmitter) to calculate an error signal. If the error signal is beyond a specified limit, an alarm may be sounded to indicate one or more receivers is defective, out of calibration, or out of operation. If multiple receivers are used (i.e., more than three), combinations of multilateration calculations may be made (using data from groups of three receivers) to determine which receiver is defective.

While the preferred embodiment and various alternative embodiments of the invention have been disclosed and described in detail herein, it may be apparent to those skilled in the art that various changes in form and detail may be made therein without departing from the spirit and scope thereof.

For example, in the embodiments illustrated above, a plurality of receivers may be used to multilaterate position of a transmitter (e.g., aircraft, or SSR). However, in the instance of an SSR, a single receiver may be used to detect error, if a time-stamp signal can be generated by the SSR indicating the time an SLS pulse is transmitted. From that data and receiver time-stamp data, an elapsed time can be calculated and compared to the known distance between the transmitter and receiver.

What is claimed is:

1. A method for calibrating a multilateration system, comprising the steps of:
    receiving, at a plurality of first radio receivers having known position values, a first radio signal from a first transmitter having a known position value;
    measuring a first time value when the first radio signal is received at one of the plurality of first radio receivers;
    measuring first time difference values between when the first radio signal is received at the one of the plurality of first radio receivers and when the first radio signal is received at others of the plurality of first radio receivers;
    calculating a first theoretical time difference values for each of the others of the plurality of first radio receivers based upon the known position value of the first transmitter and the known position values of the first radio receivers; and
    generating first error correction values, for each of the others of the plurality of first radio receivers, proportional to the difference between the first time difference values and the first theoretical time difference values.

2. The method of claim 1, wherein said step of measuring first time difference values comprises the steps of:
    measuring a second time value from a calibrated time source when the first radio signal is received at one of the others of the plurality of first radio receivers;
    transmitting the second time value via a data link to a central station; and
    subtracting the second time value from the first time value to produce a time difference value for the one of the others of the plurality of first radio receivers.

3. The method of claim 2, wherein said step of generating first error correction values comprises the step of:
    generating, for each of the others of the plurality of first radio receivers, a time difference correction error value representing a difference between measured time difference for the first radio signal to travel from the first transmitter to the one of the plurality of first radio receivers and a corresponding each of the others of the plurality of first radio receivers and the calculated theoretical time difference for the first radio signal to travel from the first transmitter to the one of the plurality f first radio receivers and a corresponding each of the others of the plurality of first radio receivers.

4. The method of claim 3, further comprising the step of:
    adding the time difference correction error value for a corresponding other of the plurality of first radio receivers to subsequent measured time difference values for a corresponding other of the plurality of first radio receivers when a transponder signal is received at the corresponding other of the plurality of first radio receivers.

5. The method of claim 4, further comprising the step of:
    generating a time difference correction error value for a second radio receiver of known position not receiving the first radio signal from the first transmitter, but receiving a second radio signal from a second transmitter of initial unknown position, comprising the steps of:
        receiving, in the plurality of first radio receivers, a second radio signal from the second transmitter;
        measuring a third time value when the second radio signal from the second transmitter is received at one of the plurality of first radio receivers;
        measuring second time difference values between when the second radio signal from the second transmitter is received at the one of the plurality of first radio receivers and others of the plurality of first radio receivers;
        correcting each of the second time difference values by adding the corresponding time difference correction value to a corresponding second time difference value;
        multilaterating a position for the second transmitter to produce an accurate position value for the second transmitter;
        measuring a third time difference value between when the second radio signal from the second transmitter is received at the second radio receiver and another of the plurality of first radio receivers;

calculating a second theoretical time difference value for the second radio receiver, based upon the accurate position value of the second transmitter and the known position value of the second radio receiver; and generating a second error correction value, for the second radio receiver, proportional to the difference between the measured third time difference value and the second theoretical time difference value.

6. A method for accurately determining aircraft position, comprising the steps of:

receiving, at a plurality of first radio receivers having known position values, a sideband lobe suppression pulse from a radar transmitter having a known position value;

measuring a first time value when the sideband lobe suppression pulse is received at one of the plurality of first radio receivers;

measuring first time difference values between when the sideband lobe suppression pulse is received at the one of the plurality of first radio receivers and others of the plurality of first radio receivers;

calculating first theoretical time difference values for each of the others of the plurality of first radio receivers based upon the known position value of the radar transmitter and the known position values of the plurality of first radio receivers;

generating first error correction values, for each of the others of the plurality of first radio receivers, proportional to the difference between the measured first time difference values and the first theoretical time difference values;

receiving, at the plurality of first radio receivers, an aircraft transponder signal from an aircraft transponder responding to a radar signal from the radar transmitter;

measuring a second time value when the aircraft transponder signal is received at one of the plurality of first radio receivers;

measuring second time difference values between when the aircraft transponder signal is received at the one of the plurality of first radio receivers and others of the plurality of first radio receivers;

adding corresponding error correction values for each of the plurality of first radio receivers to each of the second difference values produce corrected second time difference values; and generating a multilaterated position value of the aircraft from the corrected second time difference values.

7. The method of claim 6, wherein said step of measuring first time difference values comprises the steps of:

measuring a third time value from a calibrated time source when a sideband lobe suppression pulse is received at one of the others of the plurality of first radio receivers using a calibrated time source; and transmitting the third time value via a data link to a central station; and subtracting the second time value from the first time value to produce a time difference value for the one of the others of the plurality of first radio receivers.

8. The method of claim 7, wherein said step of generating first error correction values comprises the step of:

generating, for each of the others of the plurality of first radio receivers, a time difference correction error value representing a difference between measured time difference for the first radio signal to travel from the first transmitter to the one of the plurality of first radio receivers and a corresponding each of the others of the plurality of first radio receivers and the calculated theoretical time difference for the first radio signal to travel from the first transmitter to the one of the plurality of first radio receivers and a corresponding each of the others of the plurality of first radio receivers.

9. The method of claim 8, further comprising the step of:

generating a time difference correction error value for a second radio receiver of known position not receiving the first radio signal from the radar transmitter, but receiving a second radio signal from the aircraft transponder, comprising the steps of:

measuring a third time difference value between when the second radio signal from the aircraft transponder is received at the second radio receiver and another of the plurality of first radio receivers;

calculating a second theoretical time difference value for the second radio receiver, based upon the accurate position value of the aircraft transponder and the known position value of the second radio receiver; and generating a second error correction value, for the second radio receiver, proportional to the difference between the measured third time difference value and the second theoretical time difference value.

10. A multilateration system, comprising:

a plurality of radio receivers of known position, for receiving a radio signal from a transmitter of known position;

means for measuring time values when the radio signal is received at each of the plurality of radio receivers;

means for generating a plurality of time difference values between measured time values for the plurality of radio receivers;

means for calculating theoretical time difference values between measured time values for the plurality of radio receivers based upon the known position value of the transmitter and the known position values of the radio receivers;

means for generating error correction values, for each of the plurality of time difference values, proportional to the difference between the measured time difference values and the theoretical time difference values; and means for adding the error correction values to subsequently recieved time difference values generated in response to a received radio signal from a transmitter of initial unknown position, to generate corrected time difference values; and means for generating a multilaterated position value of the transmitter of initial unknown position from the corrected measured time difference values.

11. The multilateration system of claim 10, wherein said means for measuring time values when the radio signal is received at the plurality of radio receivers comprises:

means for measuring a time value from a calibrated time source when the radio signal is received at a radio receiver; and means for transmitting the time value via a data link to a central station.

12. The multilateration system of claim 11, wherein said means for generating a multilaterated position value of the transmitter from the measured time difference values comprises:

means for receiving, at the central station, over the data link, a corresponding time value from each of the plurality of radio receivers;

means for measuring difference between time values to generate time difference values; and means for generating a multilaterated position value of the transmitter from the time difference values and the known positions of each of the plurality of radio receivers.

13. The multilateration system of claim 12, further comprising:

means for generating, from error correction values for each of the plurality of radio receivers, an error correction value for a radio receiver of known position not receiving the radio signal using the transmitter of initial unknown position as a source signal, and calculating a time difference correction value based upon theoretical time difference values from the transmitter of initial unknown position, using the multilaterated position, and actual time difference values measured from radio signals from the transmitter of initial unknown position.

14. A method of accurately multilaterating position of a transmitter of unknown position, comprising the steps of:

multilaterating a position of a first transmitter of known position to generate a first multilaterated position value;

comparing the first multilaterated position value with the known position of the first transmitter to generate a difference value;

multilaterating a position of a second transmitter of unknown position to generate a second multilaterated position value; and correcting the second multilaterated position value by applying the correction value to the second multilaterated position value.

* * * * *